United States Patent Office 3,783,136
Patented Jan. 1, 1974

3,783,136
METHOD FOR PRODUCING UNSATURATED CARBOXYLIC ACID ESTERS
Takashi Inukai, Yokohama-shi, and Takao Nakamura, Yokosuka-shi, Japan, assignors to Chisso Corporation, Osaka, Japan
No Drawing. Filed Dec. 16, 1970, Ser. No. 98,945
Claims priority, application Japan, Dec. 24, 1969, 44/104,135
Int. Cl. C07c 67/00
U.S. Cl. 260—410.9 R          11 Claims

ABSTRACT OF THE DISCLOSURE

Unsaturated monocarboxylic acid esters which are addition compounds of an olefin to a (meth)acrylic acid ester, or unsaturated dicarboxylic acid diesters which are addition compounds of an olefin or an unsaturated monocarboxylic acid ester to a (meth)acrylic acid ester, can be produced with a high yield and without forming isomer, by reacting said olefin or said unsaturated monocarboxylic acid ester with said (meth)acrylic acid ester, at a temperature ranging from room temperature to 250° C., in the presence of $AlX_3$ (wherein X is Cl or Br).

DESCRIPTION OF THE INVENTION

This invention relates to a method for producing unsaturated mono- and/or di-carboxylic acid esters by reacting an olefin with a (meth)acrylic acid ester, and also it relates to a method for producing unsaturated di-carboxylic acid esters by reacting the above-mentioned unsaturated mono-carboxylic acid ester with a (meth)acrylic acid ester. (Meth)acrylic acid ester means methacrylic acid ester or acrylic acid ester.

It has been known that some unsaturated carboxylic acid esters can be produced by heating an olefin with an α,β-unsaturated carboxylic ester in the absence of any catalyst. However, since the reaction is generally quite slow, it requires a high temperature and a long reaction period to give only a poor yield of the product. According to Albisetti et al. [J. Amer. Chem. Soc., 78, 2637 (1956)], for example, only 13% yield of the $C_6$ δ,ε-unsaturated carboxylic ester could be obtained by heating propylene and methyl acrylate at 250° for 9 hours. In other examples by Alder et al. [Ann., 651, 141 (1962)], the same product was obtained in 30% yield by heating the same reactants at 230° for 40–50 hours, and heptene-1 and methyl acrylate give 35% yield of unsaturated carboxylic acid esters by reaction at 230–240° for 30–35 hours. These examples show that according to the conventional method a reaction temperature of around 250° or higher and a long reaction period are generally required to have the products in an acceptable yield.

Furthermore, two isomeric unsaturated carboxylic acid esters, A and B, are generally produced by the known method, as seen in the following Equation I.

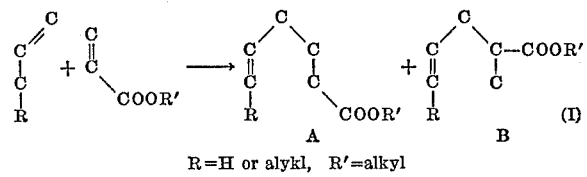

R=H or alykl, R'=alkyl

The ratio of A to B is 88:12 for R=H, and 75:25 for R=n-$C_4H_9$, according to the above-mentioned Alder et al. Therefore it is necessary to separate the isomers for commercial production of either A or B.

These two characteristics of the conventional process obviously present their significant drawbacks as the commercial production method.

The object of the present invention is to provide a method for producing unsaturated mono- and/or di-carboxylic acid esters from an olefin and a (meth)acrylic ester and further to provide a method for producing unsaturated di-carboxylic acid di-esters from an unsaturated mono-carboxylic acid ester and a (meth)acrylic acid ester, with a higher yield and without forming the above-mentioned B isomers.

The present inventors, after strenuous studies, have found the method of the present invention.

This invention consists in a method for producing unsaturated mono-carboxylic acid esters which are addition compounds of one mol of an olefin having 3–18 carbon atoms to one mol of

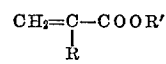

wherein R is H or $CH_3$ and R' is an alkyl of 1–12 carbon atoms, which method comprises reacting said olefin with said

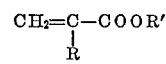

at a temperature ranging from room temperature to 250° C., in the presence of $AlX_3$ wherein X is chlorine or bromine atom.

Further, it consists in a method for producing unsaturated dicarboxylic acid diesters which are addition compounds of one mol of an unsaturated mono-carboxylic acid ester expressed by a general formula,

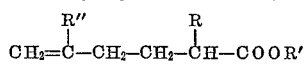

wherein R is H or $CH_3$, R' is an alkyl having 1–12 carbon atoms, and R'' is H or $CH_3$, to one mol of

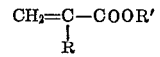

wherein R and R' are the same as defined above, which method comprises reacting said

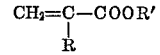

with said unsaturated monocarboxylic acid ester, at a temperature ranging from room temperature to 250° C., in the presence of $AlX_3$ wherein X is chlorine or bromine atom.

Furthermore, it consists in a method for producing unsaturated dicarboxylic acid diesters which are addition compounds of one mol of an olefin selected from the group consisting of propylene, isobutene and mixture thereof to two mols of

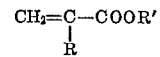

wherein R is H or $CH_3$ and R' is an alkyl of 1–12 carbon atoms, which method comprises reacting said olefin with said

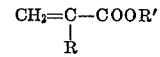

at a temperature ranging from room temperature to 250° C,. in the presence of $AlX_3$ wherein X is chlorine or bromine atom.

In addition, it consists in a method for producing a mixture of unsaturated monocarboxylic acid esters which are addition compounds of one mol of an olefin selected from the group consisting of propylene, isobutene and mixture thereof to one mol of

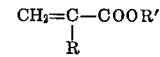

wherein R is H or CH$_3$ and R' is an alkyl of 1–12 carbon atoms, with unsaturated dicarboxylic diesters which are addition compounds of one mol of said olefin to two mols of said

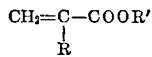

which method comprises reacting said olefin with said

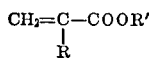

at a temperature ranging from room temperature to 250° C., in the presence of AlX$_3$ wherein X is chlorine or bromine atom.

The olefins to be used in the preparation of unsaturated monocarboxylic acid esters of the present invention can be of straight or branched chain, and the number of their carbon atoms has no particular limitation except that it must be C$_3$ or more, but it is preferable to be C$_{18}$ or less. And α-olefins among those olefins are particularly preferable.

The illustrative examples of α-olefins are propylene, butene-1, isobutene, hexene-1, dodecene-1, α-diisobutylene or the like. β-Olefins such as β-diisobutylene can be illustrated.

With regard to the preparation of unsaturated dicarboxylic acid esters of the present invention, unsaturated monocarboxylic acid esters as reactant are particularly reactive in case where the double bond thereof is at ω-position, and hence the unsaturated monocarboxylic acid esters having six carbon atoms in the principal chain thereof are practically used, while, as to the olefins as reactant, propylene, isobutene and mixture thereof are practically used, because the intermediate unsaturated monocarboxylic acid esters having started from such olefins and as mentioned above are practically reactive in the reaction with a (meth)acrylic acid ester.

The illustrative examples of the ω-unsaturated monocarboxylic acid esters are methyl 5-methyl-n-hexen-5-oate, methyl 2,5-dimethyl-n-hexen-5-oate, or the like.

Illustrative examples of the alkyl radical of (meth)acrylic acid esters are methyl, ethyl, butyl, isobutyl, n-octyl, 2-ethylhexyl, dodecyl and the like.

Catalysts to be used in the present invention are AlCl$_3$ or AlBr$_3$. AlCl$_3$ is particularly preferred.

At the use of these catalysts it is preferable to treat the catalysts with a (meth)acrylic acid ester to be used in the reaction before contacting the above-mentioned olefins or unsaturated mono-carboxylic acid esters in order to avoid the side-reactions such a cationic polymerization of these substrates by the action of the free catalysts. The amounts of catalysts to be employed can be varied depending on the kinds of the reactants and on the intended duration of reaction, but 1–30 mol percent of the catalyst based on the (meth)acrylic acid ester is generally used. Too small amount thereof necessitates a long reaction time, whereas too large amount thereof is unsuitable because after-treatment such as catalyst removal becomes cumbersome due to the undissolved part of catalyst.

Solvent is not an essential factor of this invention. Thus the reaction can be carried out in the absence of solvent or as the case may be in the excess of one of the reactants, for example, an olefin to be used, as a virtual solvent. Inert solvents such as hexane, benzene, and carbon tetrachloride, ethylene chloride, ethyl acetate, etc. can be used as the medium.

The reaction temperatures are usually selected from room temperature up to about 250° C. depending on the kinds of the reactants and the intended period of reaction.

The actual procedures of the present invention are shown by the examples below.

Comparing the method by this invention with the above-mentioned known method, it is evident that in the method of this invention, the reaction proceeds much more smoothly, that is, gives a higher conversion in the same reaction period at the same temperature, or enables to use a lower reaction temperature to obtain a better yield of the product.

Generally the double bond of the olefin is switched to the adjacent position as shown in the following equations, II and II'.

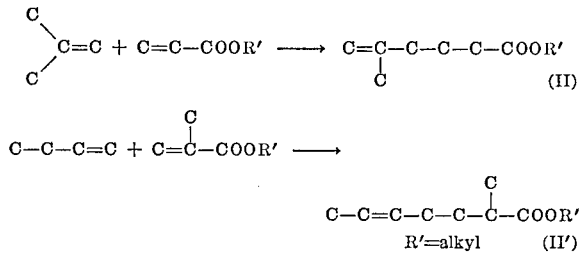

For example, the reaction of isobutene and acrylic acid ester in the presence of aluminum chloride proceeds at room temperatures according to the Equation II to give alkyl 5-methyl-n-hexen-5-oate quite easily.

Another particular feature of this invention consists in a high selectivity of the reaction. As described above, the known method gives a mixture of A and B isomers. Whereas, it is of particular value that only A-type product is selectively formed according to the method of the present invention, not only because it has an obvious advantage due to the simplicity of manufacturing process but also because it can give pure unbranched unsaturated carboxylic acid esters when the reactants are unbranched α-olefins and acrylic acid esters. As the examples of this latter feature, it can be shown that the reaction of propylene and methyl acrylate gives A (R=R'=CH$_3$), a precursor for caproic acid, and that n-heptene-1 and methyl acrylate give A (R=n-C$_4$H$_9$, R'=CH$_3$), a precursor for n-decanoic acid.

It is a matter of course that branched chain olefins and methacrylic acid esters can be used equally well as the reactants for production of the corresponding ester products.

The method of the present invention also comprises the following production of the dicarboxylic acid diesters. Thus when ω-unsaturated mono-carboxylic acid esters are used as the one component the unsaturated dicarboxylic acid diesters are easily obtained. For example, from methyl 5-methyl-n-hexen-5-oate and an acrylic acid ester is obtained a dimethyl 4-methyl-heptene(3)-1,7-dicarboxylate (Eq. III) as the main product. Some exo-methylene isomer is formed as the by-product.

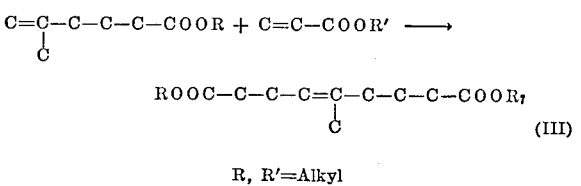

By combination of reactions II and III, it is obvious that the dicarboxylic acid diester can be obtained in a single operation starting from an olefin and a (meth) acrylic acid ester.

A specific example is that, in the reaction of isobutene and an acrylic acid ester, the use of a large excess of isobutene allows to obtain a 1:1 adduct (alkyl 5-methyl-n-hexen-5-oate) according to Eq. II and the use of an excess of acrylic acid ester leads to the formation of the 1:2 adduct (dialkyl 4-methyl-heptene-(3)-1,7-dicarboxylate) by consecutive reactants II plus III.

Since isobutene reacts most readily with the (meth) acrylate at a lower temperature among the olefins to be used in the method of the present invention, the utilization of such a feature enables to use as a raw material of isobutene, a butene mixture being commercially available and comprising isobutene, n-butene (1), n-butene (2), saturated hydrocarbons, etc. without any particular purification, to cause substantially isobutene alone with the (meth)acrylate while to cause the other components to be a solvent for the reaction and thereby to obtain the objective product easily and commercially.

The unsaturated carboxylic acid esters and dicarboxylic acid diesters produced according to this invention can be used as, for example, solvents, plasticizers, precursors for epoxides, and as chemical intermediates.

The following examples will illustrate this invention without limiting the scope thereof. The structure of the products were confirmed by NMR (nuclear magnetic resonance) absorption in addition to the analyses particularly indicated.

EXAMPLE 1

97 g. of hexene-1 and a small quantity of hydroquinone as a polymerization inhibitor were added to a solution of 5.20 g. of anhydrous aluminum chloride in 23 g. of methyl acrylate. The solution was heated at 150° C. in an autoclave for 3.5 hrs. without using any solvent. The resulting mixture was washed with water, dried with anhydrous sodium sulfate, and was subjected to distillation to give unreacted hexene-1 and methyl acrylate and 16.1 g. (39% yield) of methyl n-nonen-5-oate, B.P. 77–78 (9 mm. Hg).

*Elementary analysis.*—Theoretical (percent): C, 70.55; H, 10.66. Found (percent): C, 70.7; H, 10.8.

In the absence of the catalyst, no reaction product was obtained at the reaction conditions of 150° C., 21 hrs.

The reaction at 250–310° C., 21 hrs., in the absence of the catalyst gave 3.1 g. of the mixed unsaturated esters (A-type plus B-type), 5.5 g. of unknown product, B.P. 63–166 (2 mm. Hg), and 32 g. of dark resin.

EXAMPLE 2

Aluminum chloride, 6.50 g., was dissolved into a solution of methyl acrylate, 20.5 g., in 70 ml. of benzene in an autoclave and 58 g. of propylene was charged under pressure. After reaction at 100° C. for 20 hrs. followed by degassing of unreacted propylene and distillation, was obtained methyl n-hexen-5-oate, B.P. 100 (150 mm. Hg), 4.45 g. (14.6% yield).

EXAMPLE 3

Methyl acrylate, 102.6 g.; aluminum chloride 33.5 g.; benzene, 350 ml.; hydroquinone, 0.9 g.; and propylene, 190 g., were charged in an autoclave and heated at 150° C. for 7.5 hrs.

Methyl n-hexen-5-oate, 46.6 g. (30.3% yield), and dimethyl n-heptene-(3)-1,7-dicarboxylate 9.9 g., B.P. 120–122 (4 mm. Hg), were obtained by distillation of the reaction mixture.

EXAMPLE 4

Methyl acrylate, 33 g.; aluminum chloride, 11.95 g.; hexane, 100 ml.; and propylene, 64 g., were heated at 145–150° C. for 7 hrs. in an autoclave, to obtain 15 g. of methyl n-hexen-5-oate (31% yield).

The control experiment, without aluminum chloride catalyst used, gave no reaction.

EXAMPLE 5

6.0 g. of aluminum chloride was mixed with 26.85 g. of methyl acrylate to make a homogeneous solution. The solution and dodecene-1, 75.6 g., were heated to 150° C. for 10 hrs. The resulting mixture was worked up in the usual way to obtain methyl n-pentadecene-5-oate, 13.3 g., B.P. 157 (8 mm. Hg).

EXAMPLE 6

Methyl acrylate, 26.6 g. in which aluminum chloride was added, and isobutene, 31.37 g., were stirred at room temperature for 45 hrs. in an autoclave. Methyl 5-methyl-n-hexen-5-oate, 15.93 g. (36.3% yield), B.P. 95–98 (70 mm. Hg), and dimethyl 4-methyl-heptene-(3)-1,7-dicarboxylate, 1.97 g. (11.2% yield), B.P. 156–160 (13 mm. Hg), were obtained. As to the latter product, the observed value of molecular weight was 122 (theoretical: 228), the NMR value of dimethyl ester of 5-methyl-azelaic acid obtained by hydrogenating the product accorded with the theoretical value; and the values of elementary analysis were as follows:

Theoretical (percent): C, 62.58; H, 9.63. Found (percent): C, 62.4; H, 9.5.

EXAMPLE 7

Methyl acrylate, 51.0 g.; aluminum chloride, 8.10 g.; benzene, 80 ml.; and isobutene, 96.3 g. were heated in an autoclave at 80° C. for 3.5 hrs. Methyl 5-methyl-n-hexen-5-oate, 47.5 g. (56.5% yield), and dimethyl 4-methyl-heptene-(3)-1,7-dicarboxylate, 11.6 g. (17.2% yield), were obtained.

EXAMPLE 8

Methyl acrylate, 94.5 g.; aluminum chloride, 9 g.; benzene, 90 ml.; and methyl 5-methyl-n-hexen-5-oate, 142.2 g., were heated at 80° C. for 8 hrs. The reaction mixture was worked up in the usual way to obtain 176 g. (77% yield) of dimethyl 4-methyl-hepten-(3)-1,7-dicarboxylate.

EXAMPLE 9

Methyl methacrylate, 33.2 g.; aluminum chloride, 4.3 g.; benzene, 44 g.; hydroquinone, 0.1 g.; and isobutene, 68 g., were heated at 85° C. for 6 hrs. in an autoclave. Methyl 2,5-dimethyl-n-hexen-5-oate, 23.6 g., B.P. 101–103 (70 mm. Hg), and dimethyl 1,4,7-trimethyl-heptene-(3)-1,7-dicarboxylate, 6.4 g., B.P. 150–155 (10 mm. Hg), were obtained.

EXAMPLE 10

6.4 g. of aluminum chloride was dissolved in 64.2 g. of n-butyl acrylate and 50 ml. of benzene, and 60 g. of isobutene was charged under pressure into the resultant solution. The resultant mixture were heated at 80° C. for 6 hrs. n-Butyl 5-methyl-n-hexen-5-oate, 45.1 g., B.P. 168–170 (12 mm. Hg), and dibutyl 4-methyl-heptene-(3)-1,7-dicarboxylate, 5 g., B.P. 180–182 (5.5 mm. Hg) were obtained.

EXAMPLE 11

A mixture of 26.85 g. of methyl acrylate, 13.5 g. of aluminum bromide and 60 ml. of benzene was fed into an autoclave and 35.0 g. of isobutene was charged therein under pressure. The content was then heated at 80° C., for 3.5 hrs. Methyl 5-methyl-n-hexen-5-oate, 15.3 g. (34.7% yield), and dimethyl 4-methyl-heptene-(3)-1,7-dicarboxylate, 3.2 g. (10.4% yield) were obtained.

EXAMPLE 12

A mixture of methyl acrylate, 68.8 g.; aluminum chloride, 9.2 g; ethyl acetate, 46 g.; and isobutene, 19.0 g., was heated at 80° C., for 5 hrs. Methyl 5-methyl-n-hexen-5-oate, 31.7 g. (66% yield based on isobutene) and dimethyl 4-methyl-heptene-(3)-1,7-dicarboxylate, 19.4 g. (28.8% yield) were obtained.

EXAMPLE 13

A mixture of isobutene, 19.0 g.; methyl acrylate, 69.2 g.; aluminum chloride, 9.2 g.; and ethylene chloride, 50 ml., was heated at 90° C., for 4 hrs. Methyl 5-methyl-n-hexen-5-oate, 5.0 g. (10.4% yield based on isobutene) and dimethyl 4 - methyl-heptene - (3)-1,7-dicarboxylate, 36.3 g. (54% yield based on isobutene) were obtained.

EXAMPLE 14

A mixture of methyl acrylate, 18.5 g.; α-diisobutylene, 44.3 g.; aluminum chloride, 2.8 g.; and ethylene chloride, 50 ml., was boiled for 20 hrs. under reflux. The reaction mixture, after decomposition of catalyst with water, was treated in the same manner as in the above-mentioned to give 41.5 g. of 1:1 addition compound, B.P. 105–108 (17 mm. Hg) (97% yield). This compound was subjected to ozonolysis to give methyl neopentyl ketone and methyl 4-oxo-butanoate with high yields. Thus, the above-mentioned reaction product was confirmed to be methyl 5,7,7-trimethyl-octen-4-oate. It is considered that in this reaction, the double bond of the product is once formed at β-position of α-diisobutylene, and then rearranged to α-position thereof.

A control experiment was carried out by heating at 300° C. without using any catalyst to give addition compounds with a low yield. These compounds were different from the above-mentioned compounds obtained by using said catalyst, aluminum chloride, and were a mixture of methyl 5,7,7-trimethyl-octen-5-oate and methyl 5-methylene-7,7-dimethyl-octanoate.

EXAMPLE 15

A mixture of methyl acrylate, 18.5 g.; β-diisobutylene, 23 g.; aluminum chloride, 2.7 g.; and benzene, 50 ml., was boiled for 20 hrs. under reflux to give 20.9 g. of 1:1 addition compound, B.P. 105–108° (17 mm. Hg). This product was the same methyl 5,7,7-trimethyl-octen-4-oate as in the above-mentioned reaction product of α-diisobutylene. It is considered that in this reaction, the double bond of β-diisobutylene was rearranged to α-position thereof and took the same reaction course as in the above-mentioned Example 14.

EXAMPLE 16

A mixture of 2-ethylhexyl acrylate, 116 g.; isobutene, 17.7 g.; aluminum chloride, 8.4 g.; and benzene, 84 ml., was heated at 80° C., for 8 hrs. The reaction mixture was treated similarly to the above-mentioned to give 29.6 g. of 2-ethylhexyl 5-methyl-n-hexen-5-oate, B.P. 110–120° (3 mm. Hg) and 40.9 g. of di-2-ethylhexyl 4-methyl-hepten-(3)-1,7-dicarboxylate, B.P. 200–207° (3 mm. Hg).

What is claimed is:
1. The method which comprises
   (a) reacting
      (1) an olefin selected from the group consisting of propylene, dodecene-1, isobutene, α-diisobutylene, β-diisobutylene, methyl 5-methyl-n-hexen-5-oate and hexene-1,
   with
      (2) a compound selected from the group consisting of methyl acrylate, methyl methacrylate, and n-butyl acrylate,
   (b) said reaction of (a)(1) and (a)(2) being carried out at a temperature ranging from room temperature to 250° C.,
   (c) said reaction of (a)(1) and (a)(2) being carried out in the presence of AlX₃ wherein X is a chlorine or bromine atom, the amount of AlX₃ being 1–30% by weight based upon the compound set forth in (a)(2), and
   (d) recovering the unsaturated carboxylic acid ester produced by the reaction.
2. A method for producing unsaturated monocarboxylic acid esters which are addition compounds of one mole of an olefin having 3–18 carbon atoms to one mole of a raw material compound of unsaturated monocarboxylic acid ester having the general formula

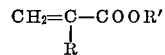

wherein R is H or CH₃ and R' is an alkyl of 1–12 carbon atoms, which method comprises
   (a) reacting
      (1) said olefin
   with
      (2) said raw material.
   (b) said reaction of (a)(1) and (a)(2) being carried out at a temperature ranging from room temperature to 250° C.,
   (c) said reaction of (a)(1) and (a)(2) being carried out in the presence of AlX₃ wherein X is a chlorine or bromine atom, the amount of AlX₃ being 1–30% by weight based upon the compound set forth in (a)(2), and
   (d) recovering an unsaturated monocarboxylic acid ester.
3. A method for producing unsaturated dicarboxylic acid diesters which are addition compounds of one mol of a first compound having the formula

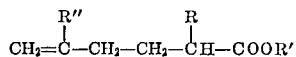

where
   R is H or CH₃,
   R' is an alkyl having 1–12 carbon atoms, and
   R" is H or CH₃,
with a second compound having the formula

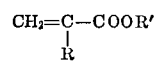

wherein
   R is H or CH₃, and
   R' is an alkyl of 1–12 carbon atoms,
which method comprises
   (a) reacting
      (1) said first compound
   with
      (2) said second compound,
   (b) said reaction of (a)(1) and (a)(2) being carried out at a temperature ranging from room temperature to 250° C.,
   (c) said reaction of (a)(1) and (a)(2) being carried out in the presence of AlX₃ wherein X is a chlorine or bromine atom, the amount of AlX₃ being 1–30% by weight based upon the compound set forth in (a) (2), and
   (d) recovering an unsaturated dicarboxylic acid diester.
4. The method for producing unsaturated dicarboxylic acid diesters which are addition compounds of one mol of an olefin selected from the group consisting of propylene and isobutene and two mols of a second compound having the formula

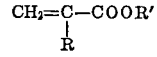

wherein
   R is H or CH₃,
   R' is an alkyl of 1–12 carbon atoms,
which method comprises
   (a) reacting
      (1) said olefin
   with
      (2) said second compound,
   (b) said reaction of (a)(1) and (a)(2) being carried out at a temperature ranging from room temperature to 250° C.,
   (c) said reaction of (a)(1) and (a)(2) being carried out in the presence of AlX₃ wherein X is a chlorine or bromine atom, the amount of AlX₃ being 1–30% by weight based upon the compound set forth in (a)(2), and (d) recovering an unsaturated dicarboxylic acid diester.

5. A method according to claim 1 wherein said (a)(2) is methyl acrylate.

6. A method according to claim 5 wherein said (a)(1) compound is hexene-1.

7. A method according to claim 5 wherein said (a)(1) compound is propylene.

8. A method according to claim 5 wherein said (a)(1) compound is isobutene.

9. A method according to claim 5 wherein said (a)(1) compound is dodecene-1.

10. A method according to claim 5 wherein said (a)(1) compound is α-diisobutylene.

11. A method according to claim 5 wherein said (a)(1) compound is β-diisobutylene.

References Cited

UNITED STATES PATENTS

| | | | |
|---|---|---|---|
| 2,628,252 | 2/1953 | Albisetti, Jr. | 260—486 |
| 2,918,493 | 12/1959 | Panzer et al. | 260—485 |

FOREIGN PATENTS 545,388  8/1957  Canada.

OTHER REFERENCES

Chemical Abstracts, vol. 55, 9255c (1961).
Chemical Abstracts, vol. 61, 11879f (1964).

LEWIS GOTTS, Primary Examiner
D. G. RIVERS, Assistant Examiner

U.S. Cl. X.R.
260—485 R, 486 R